United States Patent [19]

Nagata et al.

[11] Patent Number: 5,197,123

[45] Date of Patent: * Mar. 23, 1993

[54] CONTROL APPARATUS FOR SETTING A RECORDING FORMAT FOR A RECORDING APPARATUS

[75] Inventors: Satoshi Nagata, Tama; Masaru Igarashi, Kawasaki, both of Japan

[73] Assignee: Canon Kabushiki Kaisha, Tokyo, Japan

[*] Notice: The portion of the term of this patent subsequent to Oct. 15, 2008 has been disclaimed.

[21] Appl. No.: 736,751

[22] Filed: Jul. 26, 1991

Related U.S. Application Data

[63] Continuation of Ser. No. 517,405, May 2, 1990, Pat. No. 5,058,035, which is a continuation of Ser. No. 89,339, Aug. 25, 1987, abandoned.

[30] Foreign Application Priority Data

Aug. 30, 1986 [JP] Japan .............................. 61-202715
Aug. 30, 1986 [JP] Japan .............................. 61-202720

[51] Int. Cl.$^5$ ............................................. G06F 15/00
[52] U.S. Cl. .................................... 395/148; 395/112; 395/117
[58] Field of Search ............... 364/518, 519, 523, 138, 364/464.01, 200 MS File; 395/112, 117, 148, 164

[56] References Cited

U.S. PATENT DOCUMENTS

| | | | |
|---|---|---|---|
| 4,380,796 | 4/1983 | Ostby | 364/138 X |
| 4,433,377 | 2/1984 | Eustis et al. | 364/200 |
| 4,476,542 | 10/1984 | Crean et al. | 364/900 |
| 4,497,040 | 1/1985 | Gomes et al. | 364/138 X |
| 4,520,455 | 5/1985 | Crean et al. | 364/900 |
| 4,573,115 | 2/1986 | Halgrimson | 364/138 |
| 4,628,457 | 12/1986 | Manduley | 364/464 |
| 4,710,886 | 12/1987 | Heath | 364/519 |

Primary Examiner—Gary V. Harkcom
Assistant Examiner—Mark K. Zimmerman
Attorney, Agent, or Firm—Fitzpatrick, Cella, Harper & Scinto

[57] ABSTRACT

A control apparatus and method, in which a format for a particular instance of recording is designated or set, as by instructions from a host computer, or from an operator via a keyboard, and that desired format is used or not, according to whether the necessary information for that format is present in a memory (preferably nonvolatile). If the necessary format information is present in the memory, the desired format is used for recording, while otherwise, a default format is used instead or the information for the desired format is supplied to the memory.

10 Claims, 10 Drawing Sheets

| IMAGE-MOVEMENT COMMAND | X | Y | WIDTH | LENGTH | X' | Y' |
|---|---|---|---|---|---|---|
| 801 | 802 | 803 | 804 | 805 | 806 | 807 |
| 808 | 802 | 803 | 804 | 805 | 806 | 807 |
| IMAGE-COPY COMMAND | X | Y | WIDTH | LENGTH | X' | Y' |

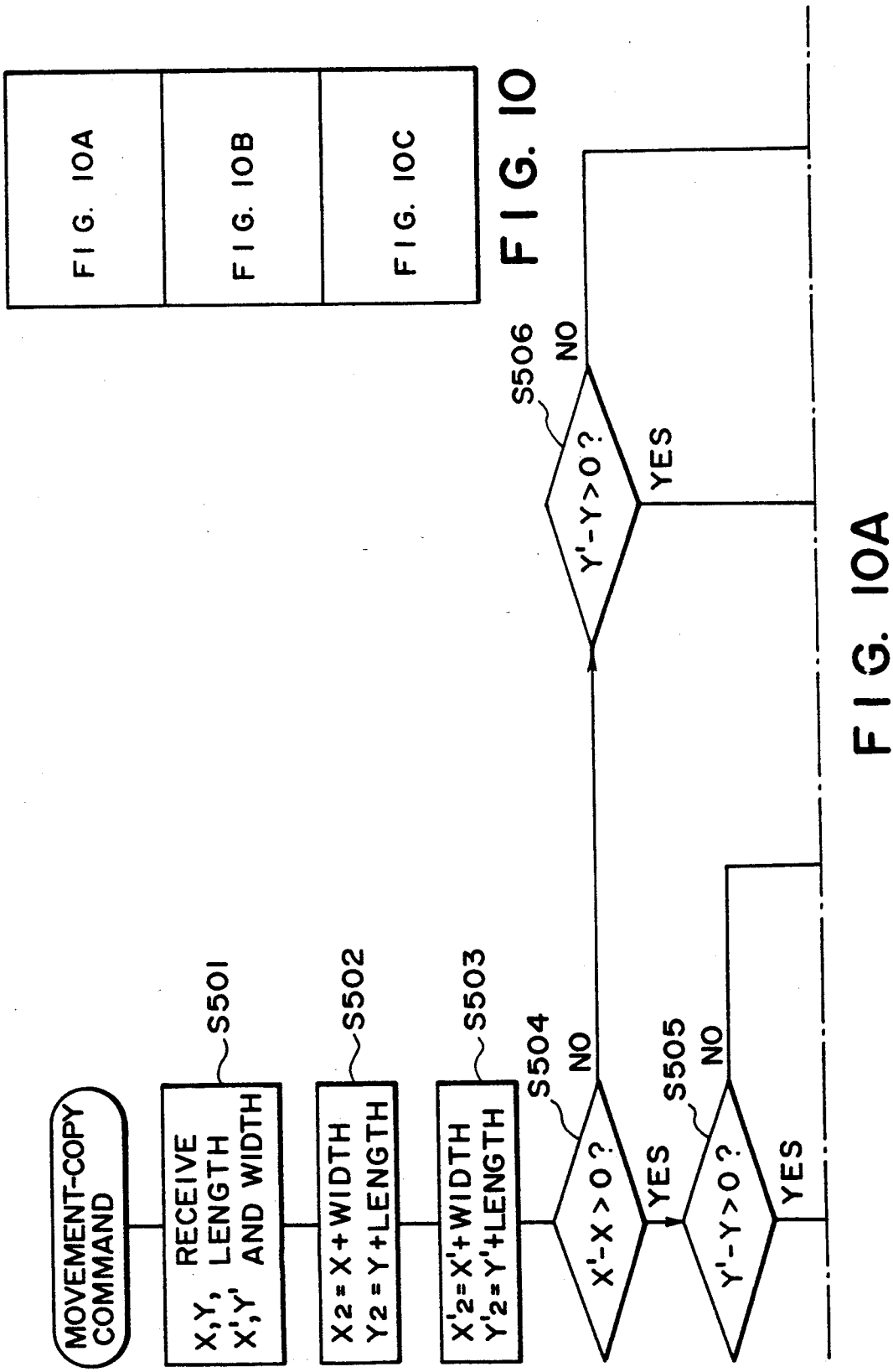

CONTROL APPARATUS FOR SETTING A RECORDING FORMAT FOR A RECORDING APPARATUS

This application is a continuation of application Ser. No. 07/517,405 filed May 2, 1990, now U.S. Pat. No. 5,058,035, which is a continuation of application Ser. No. 07/089,339, filed Aug. 25, 1987, now abandoned.

BACKGROUND OF THE INVENTION

1. Field of the Invention

The present invention relates to a recording apparatus for image recording on a recording medium according to information sent from a host apparatus.

2. Related Background Art

Image recording apparatus, such as a printer, is generally equipped with dip switches for enabling the operator to modify the functions to a certain extent. However such dip switches can only cope with modifications of rather limited functions, for example setting of interface conditions.

Recently there are also known apparatus allowing the operator to select functions through an intelligent operation panel, by the use of a non-volatile RAM instead of the dip switches. However, such apparatus, still requiring manipulation of the operation panel, only serves to facilitate the setting with the dip switches and allows the selection of individual functions only.

There are also known, as disclosed in the U.S. Pat. No. 4,059,833, apparatus in which the parameters such as the character size and the line pitch are instructed by a host apparatus such as a host computer to a printer. However such parameters have to be set to the printer by the operator every time the power supply is turned on. Also in certain apparatus such as word processors, the parameter settings of the printer are stored in a floppy disk or a non-volatile memory Provided in the host apparatus, but the operator is required to provide an instruction for reading the stored settings from said floppy disk or the like. Also in such apparatus a considerable load is unavoidable on the part of the host apparatus.

Recent development of non-impact printers, for printing characters in the form of a group of dots, has made it possible to print not only characters but also to form lines and pictures. For this reason, instead of the conventional printout of characters on an already printed business form sheet, the printout can be made by storing data for format pattern in advance and overlaying the thus stored format pattern with newly supplied data, as described in the U.S. Pat. No. 4,059,833. Such process is called form overlay.

The form and print data are usually designed separately, so that they often do not fit each other in the actual printout. It therefore becomes necessary, as shown in FIG. 7, to move a pattern ABCD to a position A'B'C'D'. In such case it has conventionally been necessary to redesign the form or the print data, involving cumbersome work.

Also in case of forming, as shown in FIG. 9, the same image in different positions 408 and 409, it has been necessary to send the same data repeatedly from the host apparatus, so that the efficiency in image forming time cannot be improved.

There is also known an apparatus in which an image displacement is made on a display such as a cathode ray tube and the displaced image is then printed, as disclosed in the U.S. patent application Ser. No. 914,150. However the image displacing process, conducted in the host apparatus, imposes a significant load thereon, and other processes cannot be executed during such image displacing process.

SUMMARY OF THE INVENTION

An object of the present invention is to provide a recording apparatus not associated with the above-mentioned drawbacks.

Another object of the present invention is to provide a recording apparatus which enables setting of the initial conditions therefor from a host apparatus such as a host computer, and which stores said set conditions in a rewritable non-volatile memory to dispense with the resetting operation even when the power supply is cut off.

Still another object of the present invention is to provide a recording apparatus in which the pattern of a desired area can be moved to a desired position in response to an instruction from the host apparatus.

Still another object of the present invention is to provide a recording apparatus capable of reducing the time required for preparing a form preparation, without redesigning of the data for a form.

Still another object of the present invention is to provide a recording apparatus capable of saving time required for the transfer of the same data and enabling efficient image formation.

The foregoing and still other objects of the present invention, and the advantages thereof, will become fully apparent from the following description to be taken in conjunction with the attached drawings.

DETAILED DESCRIPTION OF THE PREFERRED EMBODIMENTS

Now the present invention will be clarified in detail by embodiments thereof shown in the attached drawings.

Figure 2:
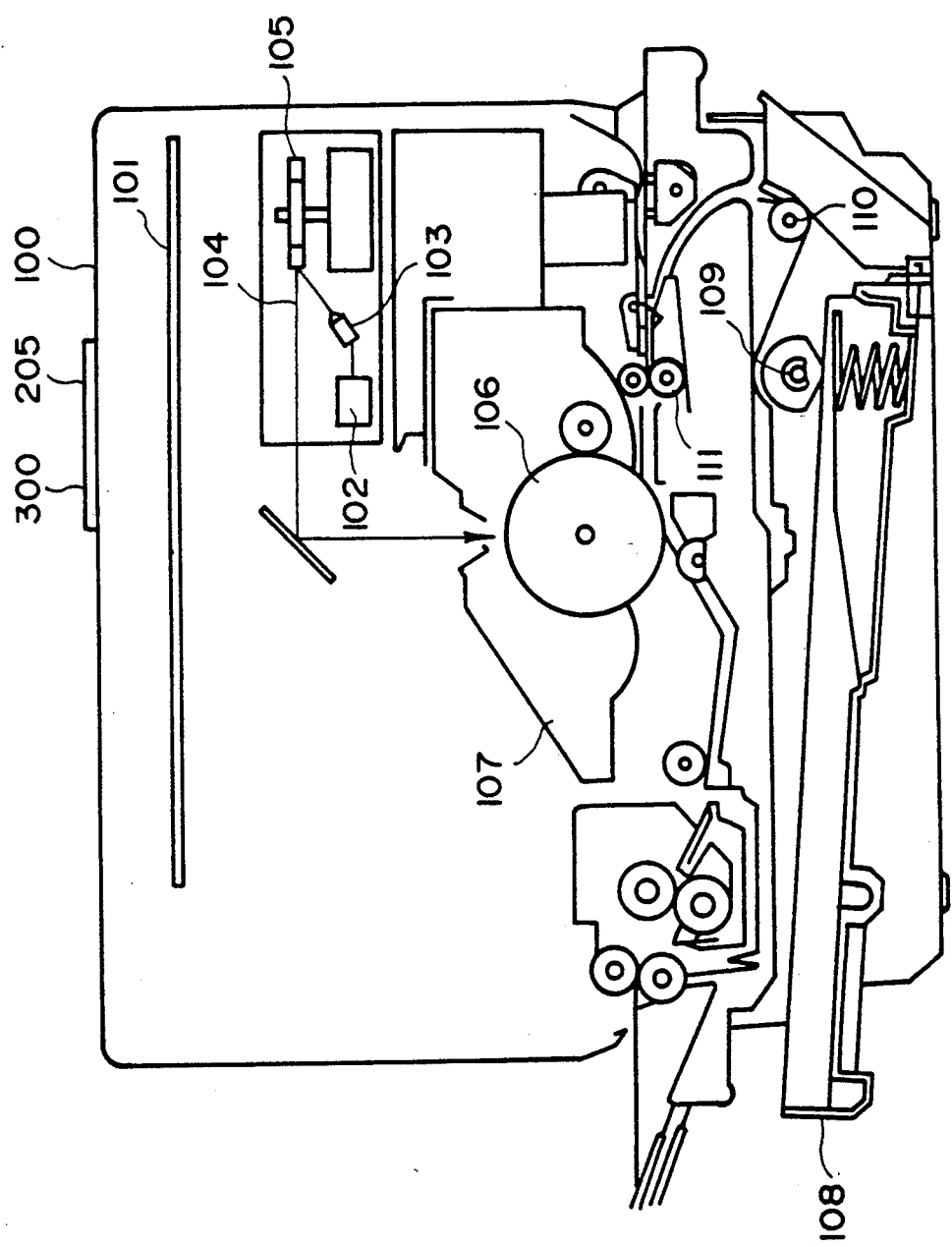
FIG. 2 is a cross-sectional view of the laser beam printer of said embodiment.

Laser Beam Printer (FIG. 2)

FIG. 2 is a cross-sectional view of the mechanism of a laser beam printer embodying the present invention.

In FIG. 2, a laser beam printer 100 converts character information supplied from an externally connected host computer and forms an image on a recording sheet. An operation panel 300 is provided with a power switch etc. A printer control unit 101 controls the entire printer 100, and analyzes the character information and control commands supplied from the host computer. Said printer control unit 101 controls or monitors various mechanisms of the printer and converts the input character information into corresponding character patterns for supply to a laser driver 102. Said laser driver 102 is provided for controlling a semiconductor laser 103, and turns on and off a laser beam 104 emitted from the semiconductor laser 103 according to the input video signal.

The laser beam, after being deflected in a lateral direction by a rotary polygon mirror 105, irradiates a photosensitive drum 106, thereby forming a latent image of the character pattern thereon. Said latent image is rendered visible by a developing unit 107 provided along the photosensitive drum 106 and is transferred onto a recording sheet. Cut recording sheets are stored in a sheet cassette 108 mounted in the laser beam printer 100, and are supplied therefrom toward the photosensitive drum 106 by means of a feed roller 109 and transport rollers 110, 111.

Figure 1:
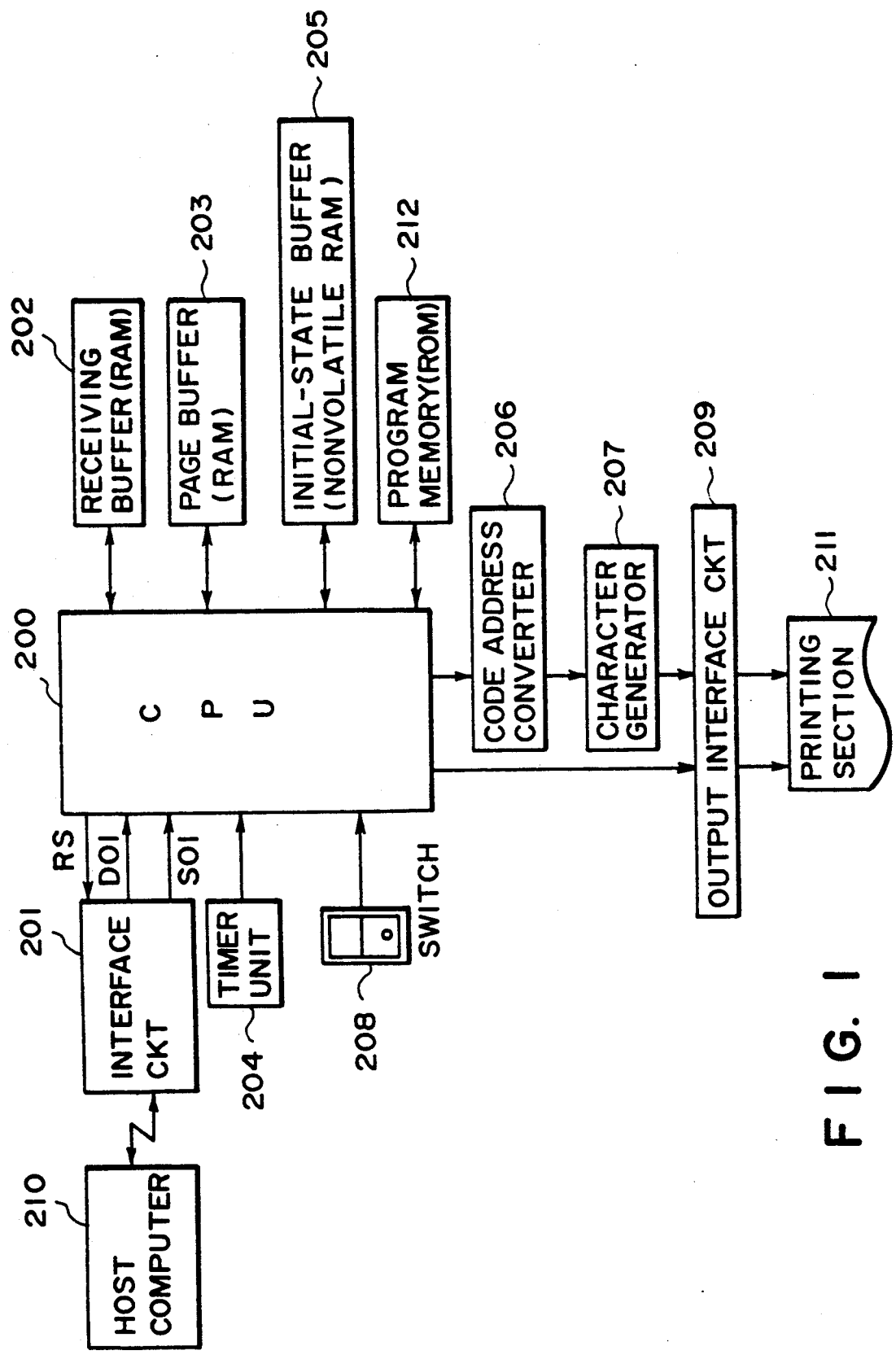
FIG. 1 is a block diagram of a printer control unit of a laser beam printer embodying the present invention.

Control Unit (FIG. 1)

FIG. 1 is a block diagram of the printer control unit 101.

Figure 4:
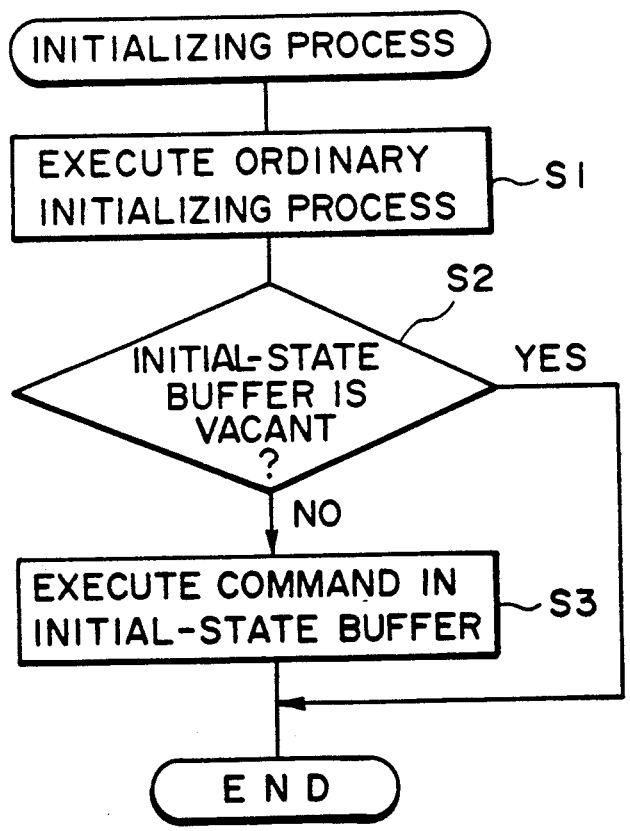
FIG. 4 is a flow chart showing an initializing sequence.
Figure 5:
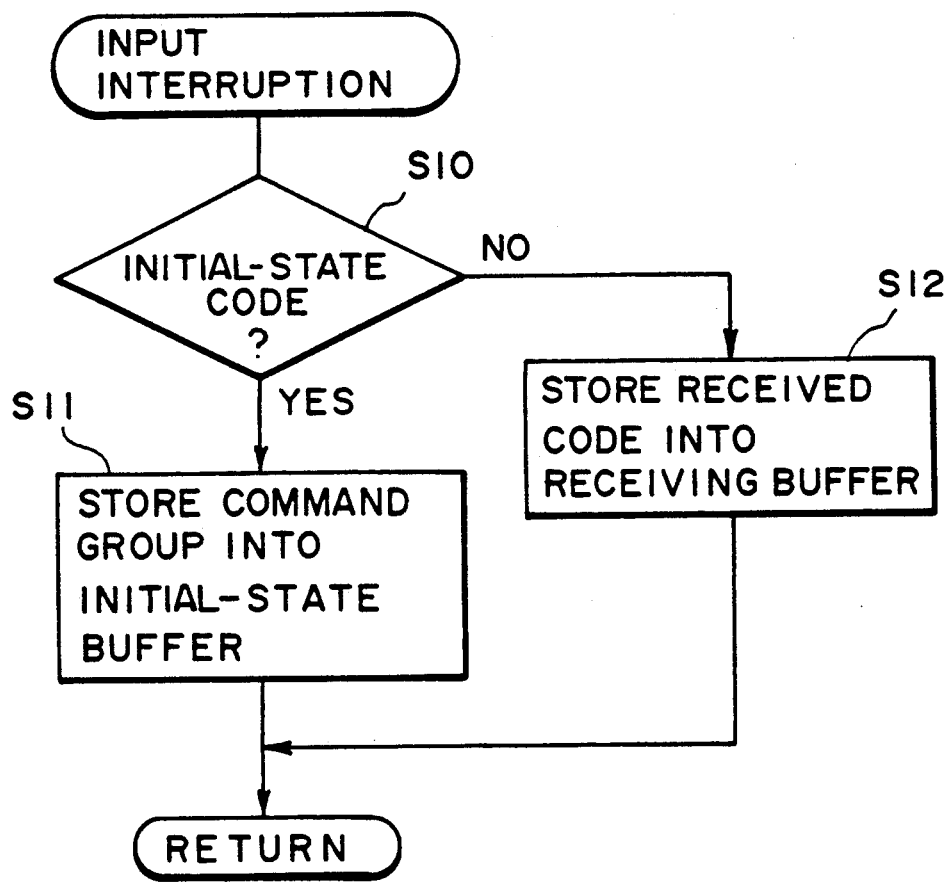
FIG. 5 is a flow chart showing an input interruption sequence.

In FIG. 1, a central processing unit (CPU) 200 has a ROM storing control programs corresponding to flow charts shown in FIGS. 4 and 5. When a power switch 208 for the printer control unit and the entire printer is turned on, a power-on reset signal is supplied to the CPU 200 whereby the CPU 200 executes an initializing program to set the laser beam printer in an initial state. Then the CPU 200 sends a request signal RS for the initializing conditions to an interface circuit 201, thus requesting a host computer 210 to transmit an instruction signal for the initializing conditions. In response the host computer 210 sends the instruction for the initializing conditions to the laser beam printer 100 and said conditions are stored in an initial-state buffer 205. Thus the laser beam printer 100 sets initializing conditions, corresponding to the stored conditions, in various ports of the printer.

If the initializing conditions need not be changed when the request signal RS is received (whether the initializing conditions are to be changed is up to the decision of the operator and is not an automatic function of the device), the host computer 210 releases a signal indicating that the change is unnecessary. Also in case no change is required, it is also possible not to release any signal from the host computer 210. It is therefore unnecessary to set the initializing conditions by sending the instruction again.

The print information sent from the host computer 210 to the laser beam printer 100 is in the form of codes.

Upon entry of the character codes from the host computer 210, an interruption signal S01 advising of said entry and a character code signal D01 are sent from the interface 201 to the CPU 200. A buffer RAM 202 is provided for temporarily storing the character code supplied from the host computer 210 through the CPU 200, which reads said character code signal D01 and temporarily stores said code in the buffer 202, according to an input interruption program started by the interruption signal S01. A page buffer RAM 203 edits thus entered character information into the unit of a page, and stores said information together with print format control information.

A timer unit 204, giving timer interruption signals to the CPU 200 at an interval for example of 100 mS, executes required task switching control, by activating a timer interruption routine in a printer control program of multi-task process. An initial-state buffer 205, composed of a non-volatile RAM for storing instructions to be executed when the power supply is turned on, stores initializing conditions. A code address converter 206 is composed of a ROM and is provided for converting the character code data into the address of a corresponding character pattern. 207 is a character generator ROM provided in the laser beam printer 100.

At the printing operation, the character generator 207 converts the character information received from the page buffer 203 in the unit of a line at a time, into Print signals of character patterns, and sends said signals to an output interface 209, which supplies a printing unit 211 with various control signals and the video signal. In response to a print start signal S03 from the CPU 200, the printing unit 211 is activated, and a print control sequence is conducted including a sheet supply, rotation of the photosensitive drum 106, activation of the laser driver 102 etc. A memory ROM 212 is provided for storing control program, etc.

Figure 3:
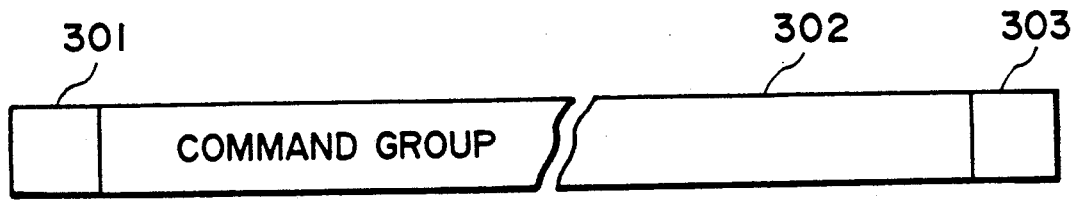
FIG. 3 is a view showing the format of an initializing command.

Initial State Command (FIG. 3).

FIG. 3 shows the format of an initial state command supplied from the host computer 210 for storage in the initial state buffer 205 of the laser beam printer 100.

There are provided a command code 301 indicating that following data are instructions to be stored in the initial state buffer; a command code 303 indicating the end of said instructions; and an initial state instruction 302 to be actually stored in the initial state buffer 205. The initial state command 302 may contain any of the instructions that can be executed by said laser beam printer. More specifically said instruction may be that for page layout (margin, line pitch, character pitch, page direction etc.), that for font selection, that for form overlay, that for moving the print position, etc.

Initializing Process (FIG. 4)

FIG. 4 is a flow chart of an initializing sequence when the power switch 208 is turned on.

When said switch 208 is turned on, the CPU 200 at first executes, in a step S1, an ordinary initialization. The CPU releases an initializing instruction for the printer, and creates a standard state or a default state in which the operator does not set any conditions (margin, pitch, font, etc.) in the initial state buffer. The data of said standard state are stored in the program memory 212, and the standard state is set for example at the shipment from the manufacturer. Then the initializing request signal RS is sent to the host computer 210. Then a step S2 discriminates whether any instruction is already stored in the initial state buffer 205, and, if not, the sequence is terminated. In this manner the initial state is always maintained constant if the operator has not set any conditions in the initial state buffer 205.

On the other hand, if any instruction has been stored in the initial state buffer 205, the sequence Proceeds to a step S3 to read the instruction a byte at a time from the initial state buffer 205, and said instruction is executed in succession. This operation is the same as the ordinary operation in which the CPU 200 reads the reception buffer 202 a byte at a time and forms the data for the page buffer 203 by executing thus read instruction, and is only different in that another buffer memory is used.

The initialization process is completed when all the contents of the initial state buffer 205 are executed. Thus an initial state desired by the operator can be arbitrarily generated without any burden.

Data Input Process (FIG. 5)

FIG. 5 is a flow chart of an input interruption process in response to the data reception from the host computer 210.

This process is started by the entry of the interruption signal S01 from the interface 201 in response to data reception, and a step S10 discriminates whether the received data contain the command code 301, i.e. whether said data are an initial state code. If an initial state code is identified, a step S11 stores the instruction data 302 in the initial state buffer 205 until the registration end code 303 is received. On the other hand, if no initial state code is identified in the step S10, the sequence proceeds to a step S12 for storing the received code in the reception buffer 202, and the sequence is terminated.

In the present embodiment the initial state is stored in a non-volatile RAM, but there may be employed a detachable, re-writable non-volatile memory such as a floppy disk or an IC card.

Also instead of using the power switch for starting the initializations, there may be employed another panel switch or an initialization command from the host computer.

In the present embodiment the initialization request signal is sent from the printer to the host computer, but it is also possible to dispense with said request signal and to send a signal indicating the conditions to be set from the host computer only when the initially set conditions are to be changed.

As explained in the foregoing, in the present embodiment, once the initial state is formed by a command defining the initial state, it need not be reset thereafter unless the initial condition become different at the start of power supply, and the transition to the initial state specific to each user can be automatically made in an easy manner, so that various requirements of the user can be securely met.

In the following there will be explained an example of printer operation in response to the initial state command supplied from the host computer.

Figure 6:
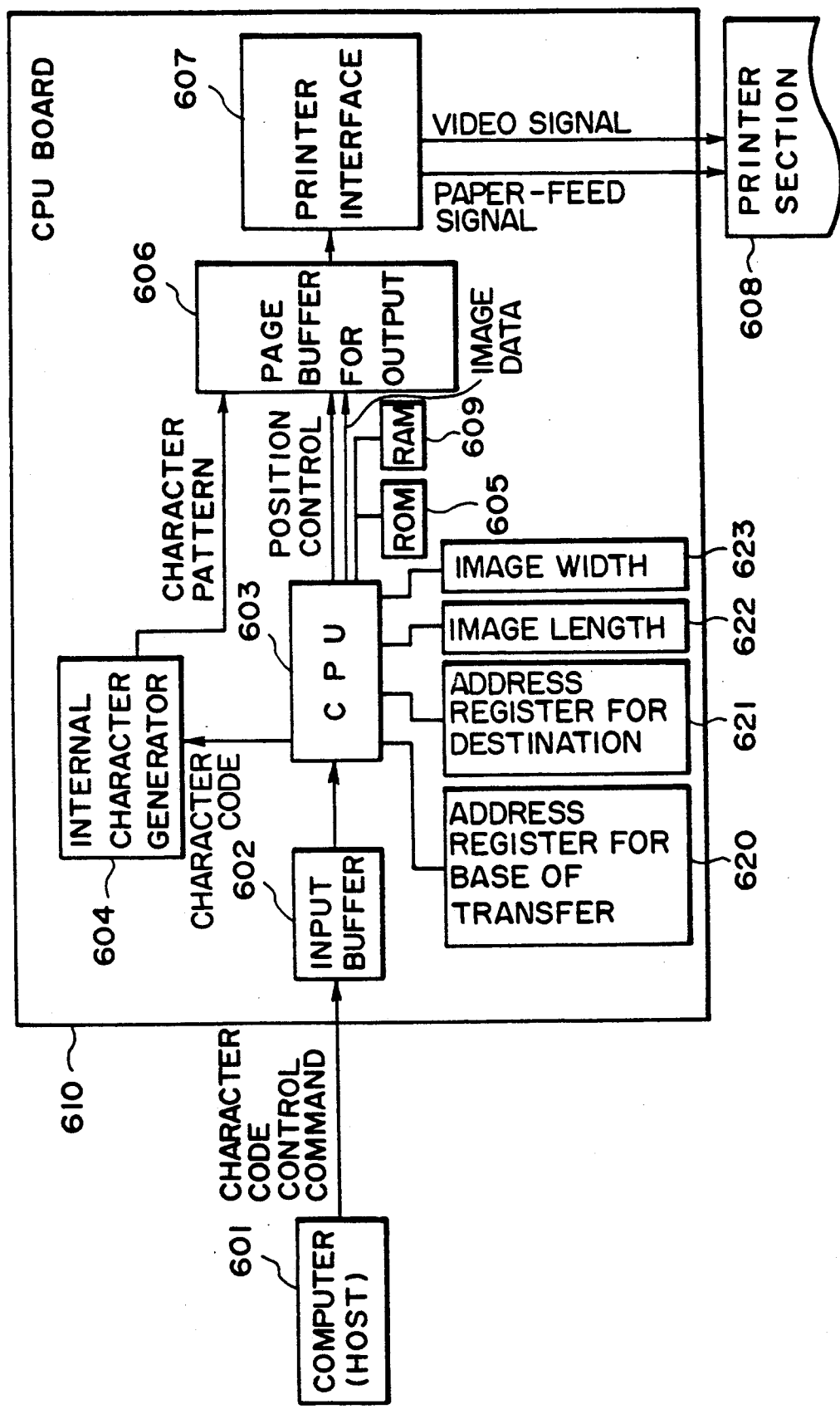
FIG. 6 is a block diagram of a recording apparatus embodying the present invention.

FIG. 6 is a block diagram of a recording apparatus embodying the present invention, and there will be explained a case of recording, with a displacement of position, character patterns (including symbols) with a page printer such as a laser beam printer, in response to character code data and control commands sent from the host computer. In FIG. 6 there are shown a host computer 601 for generating character code data and control commands to be explained later, corresponding to the host computer 210 shown in FIG. 1; a ROM 605 storing a control program; an auxiliary memory RAM 609; an input buffer 602 for temporarily storing the character code data and control commands; a CPU 603 composed of a general-purpose microprocessor; a character generator 604 for generating character patterns in response to the character code data; an originating address register 620 indicating the originating address; a destination address register 621 indicating the destination address; an image length register 622 indicating the length of the image to be transferred; an image width register 623 indicating the width of the image to be transferred; an output page buffer 606 composed of a RAM of a capacity equal to the number of dots of a page; a printer interface 607 serving as an interface with the printer and generating a video signal in response to dot information from the output page buffer 606; a printer 608 for forming an image in response to said video signal; and a control board 610.

The input information from the host computer 601 contains character codes, image data and control commands and is temporarily stored in the input buffer 602. The CPU 603 reads said input information from the input buffer 602. In the case of a character code, the CPU 603 sends said code to the character generator 604 to generate a corresponding pattern, which is stored in the output buffer 606 under the position control by the CPU 603. Image data are stored directly in the output page buffer 606.

Figures 7, 8:
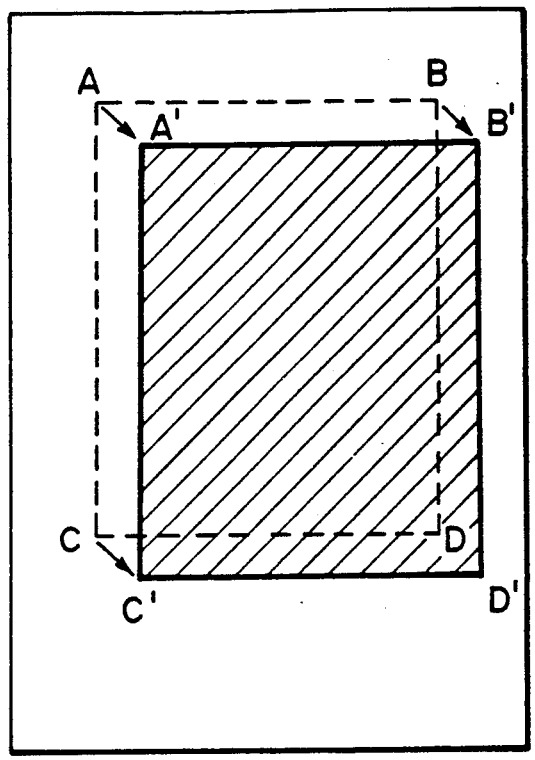
FIG. 7 is a view showing an image displacement in the recording apparatus of said embodiment.
FIG. 8 is a view showing the format of an image control command of the recording apparatus of said embodiment.
Figure 9:
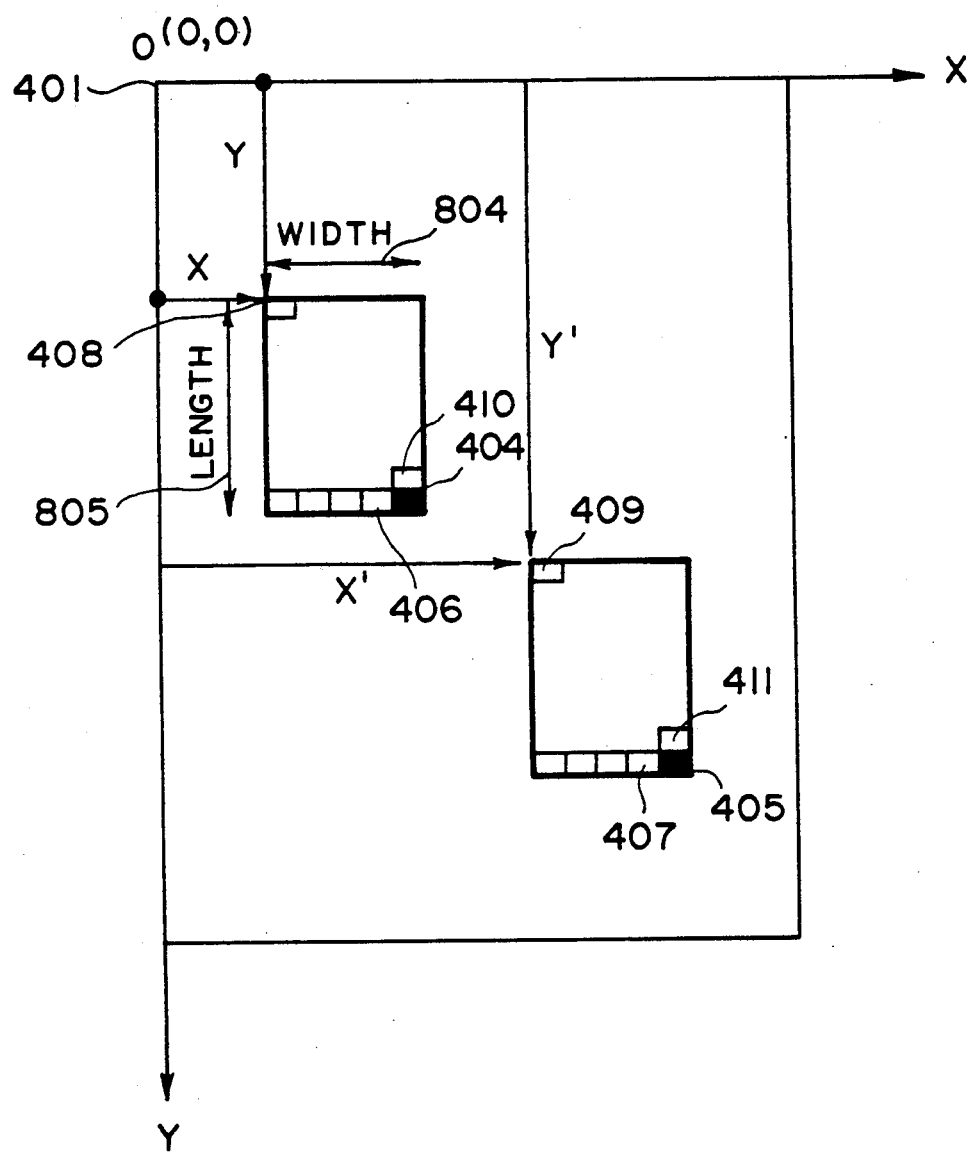
FIG. 9 is a view showing an image displacement or a copying in the recording apparatus of said embodiment.

FIG. 8 shows the format of an image control command, and FIG. 9 shows the structure of the output page buffer 606.

The output page buffer 606 has a capacity of one page. The upper left corner of the sheet is taken as the origin (0, 0), and the lateral and vertical directions are respectively taken as the X- and Y-axis. In FIG. 8, there are shown an identification code 801 indicating that it is an image movement command; x' and Y-coordinates (X, Y) 802, 803 of the upper left corner of the pattern before movement, corresponding to a position 408 on FIG. 9; a width 804 in the X-direction of the image to be moved; a length 805 in the Y-direction of the image to be moved; an X- and Y-coordinates 806, 807 of the upper left corner of the pattern after movement, corresponding to a position 409 on FIG. 9; an identification code 808 indicating an image copy command; and following data 802-807 similar to those following the image movement command 801.

Figure 10B:
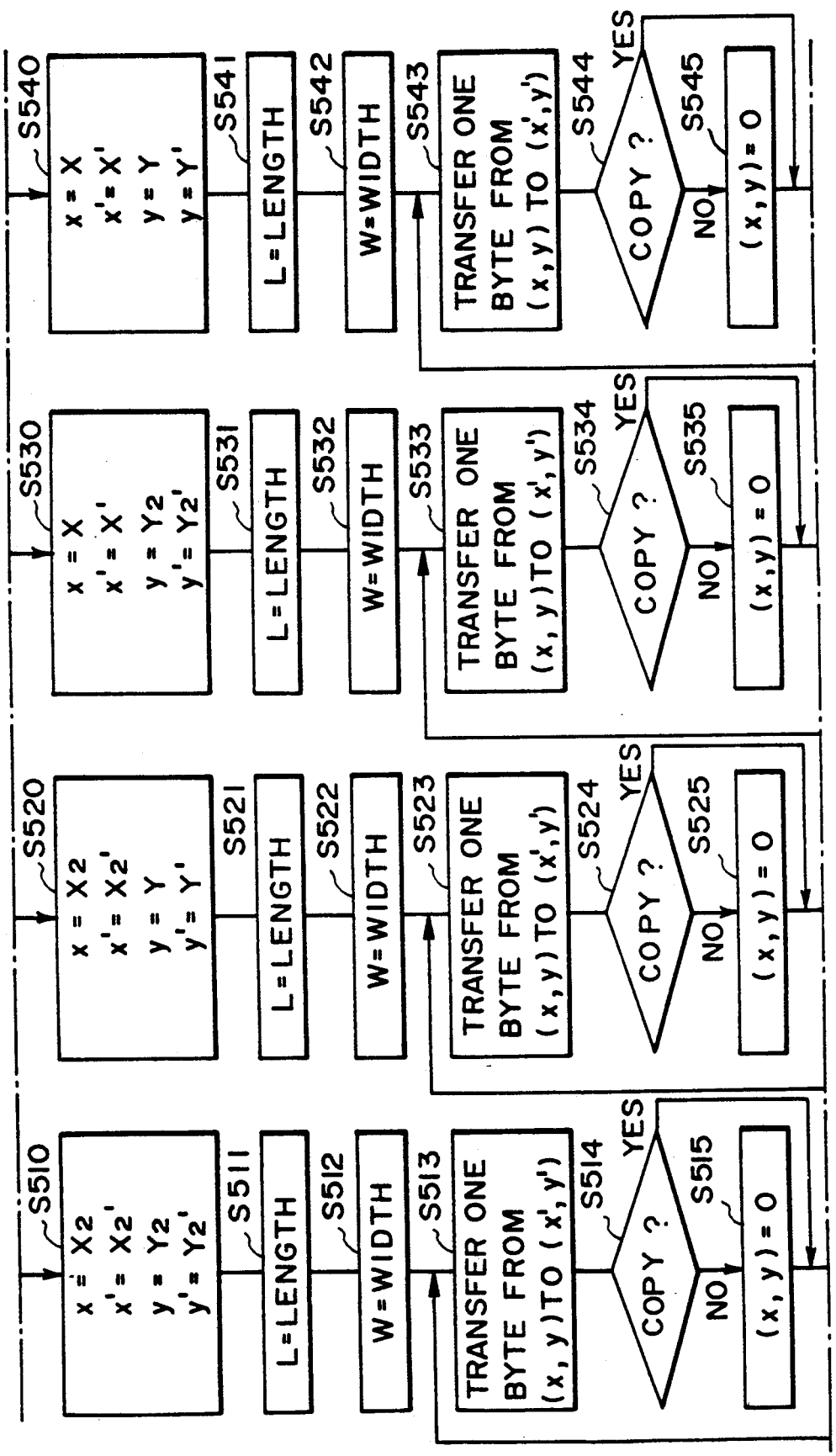
FIG. 10, consisting of FIGS. 10A, 10B and 10C, is a flow chart showing the function of the recording apparatus of said embodiment.
Figure 10C:
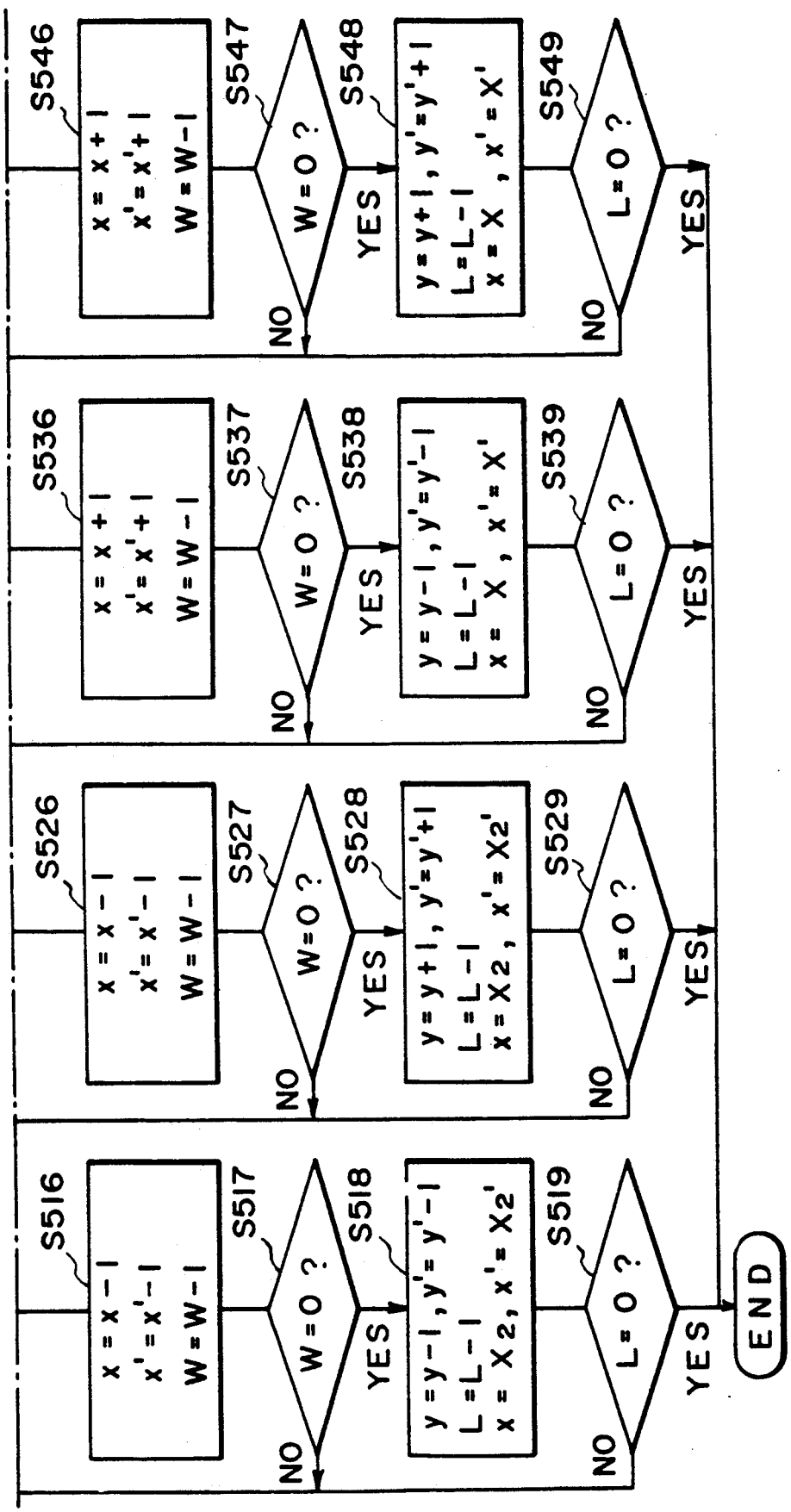

Now reference is made to a flow chart shown in FIG. 10, corresponding to a program stored in the ROM 605, for explaining the control sequence after the reception of an image movement command or an image copy command.

A step S501 reads the parameters of the image movement command or the image copy command shown in FIG. 8, and sets the X- and Y-coordinates (X, Y) 802, 803 of the upper left corner of the pattern before movement in the originating address register 620. Also the length 605 of the image and the width 804 are respectively stored in the image length register 622 and the image width register 623. A step S502 calculates the address (X2, Y2) of the lower right corner of the pattern before movement. Similarly a step S503 calculates the address (X'2, Y'2) of the lower right corner 405 of the pattern after movement. Steps S504-S506 identify the direction of movement from (X, Y) and (X', Y'). Based on the result of said identification of the direction of movement, steps S510-S519, or steps S520-S529, or steps S530-S539 are executed. In the following there will be explained the case of movement in a lower right direction (X'>X and Y'>Y).

A step S510 sets the addresses X2, Y2, X'2, Y'2, calculated in the steps S502 and S503, in work registers x, y, x' and y', which are provided in the CPU 603 but are not illustrated. A step S511 sets the content of the image length register 622 in a work register L, and step S512 sets the content of the image width register 623 in a work register W. Then a step S513 reads a byte of the lower right corner 404 of the coordinate (x, y) before movement, and writes it in the lower right corner 405 after movement indicated by the coordinate (x', y'). Then a step S514 discriminates whether a copying operation is instructed, and, if an image movement is instructed, a step S515 writes "0" in the data of the lower right corner 404 indicated by the coordinate (x, y), thus clearing the data located at the position of origin of transfer (404) before movement, i.e. the data of the original position is cleared. A step S516 then subtracts "1" from the count of the work registers x, x' and W, whereby the coordinate (x, y) indicates a position 406 adjacent, at left, to the lower right corner 404, and the coordinate (x', y') indicates a position 407 adjacent, at left, to the lower right corner 405. A step S517 then discriminates whether thus subtracted content of the image width work register W is "0". If not, steps S513–S517 are repeated.

In case said content is zero, indicating that the movement or copying in the X-direction is completed, a step S518 subtracts "1" from the count of the work registers y, y' and L, and returns the contents of the work registers x and x' to the original values x2, x'2. In this manner there are determined addresses of a position 410 immediately above the lower right corner 404 before movement and a position 411 immediately above the lower right corner 405 after movement. A step S519 discriminates whether the content of the length work register L is "0", and, if not, steps S512–S519 are repeated.

If the content of said register L is zero, indicating that the movement or copying of all the image data in the designated area is completed, the process is terminated. In such moving or copying process, the original area an 1 moved area may partially overlap as shown in FIG. 7.

In the following there will be explained overlaying of a form and print data. In the structure shown in FIG. 6, the pattern of the form and the pattern of the data may be separately stored in the output page buffer 106. In this case the form pattern is stored at first, and is then moved so as to match the data pattern as explained before, and is recorded in overlay with the data pattern. Also if a buffer for storing the form pattern is provided in the circuit shown in FIG. 6, the overlay can be easily achieved by the movement of either the form pattern or the data pattern.

In the foregoing embodiment the address of the upper left corner of the pattern before movement is used as reference, but it is also possible to use the address of one of other three corners for the same purpose.

Also the host computer may be replaced by a reader unit for generating electric signals by reading an original image.

The present invention is not limited to the foregoing embodiment but is subject to various modifications and variations within the scope and spirit of the appended claims.

We claim:

1. A method of setting a recording format for a recording apparatus which records information based on recording information generated from an information generating apparatus, comprising the steps of:

inputting a recording format from the information generating apparatus, the recording format being for use in recording of recording information on a recording medium;

storing the recording format input in said inputting step, in a non-volatile memory included in the recording apparatus;

determining whether or not a particular recording format has been stored in the non-volatile memory;

storing the particular recording format, stored in the recording apparatus, in the non-volatile memory, when the particular recording format has not been recorded in the non-volatile memory; and causing the recording apparatus to record the recording information on the basis of the particular recording format stored in the non-volatile memory.

2. A method according to claim 1, wherein said determining step is executed when power is supplied to turn the recording apparatus on.

3. A method according to claim 1, wherein said recording format includes information representing a character pitch for use by the recording apparatus in recording.

4. A method according to claim 1, wherein each recording format includes information representing a space between character lines for use by the recording apparatus in recording.

5. A control apparatus which controls a recording apparatus, said control apparatus comprising:

input means for inputting recording format information for use in recording of information by the recording apparatus;

a non-volatile memory for storing the recording format information input by said input means;

a first memory for storing a default format;

setting means for setting a recording format for actual use by the recording apparatus, wherein said setting means operates based on whether or not recording format information for the recording format has been stored in said non-volatile memory, and wherein said setting means sets the recording format on the basis of the recording format information stored in said non-volatile memory when recording format information for the recording format has been stored in said non-volatile memory, and sets the recording format on the basis of the default format stored in said first memory when recording format information for the recording format has not been stored in said non-volatile memory.

6. A control apparatus according to claim 5, wherein said setting means decides whether or not recording format information for a particular recording format has been stored in said non-volatile memory, when power is supplied to turn said control apparatus on.

7. A control apparatus according to claim 5, wherein each recording format includes information representing a character pitch for use by the recording apparatus in recording.

8. A control apparatus according to claim 5, wherein each recording format includes information representing a space between character lines for use by the recording apparatus in recording.

9. A control apparatus which controls a recording apparatus which records information based on recording information generated by an information generating apparatus, said control apparatus comprising:

input means for inputting, from the information generating apparatus, recording information to be recorded by the recording apparatus;

first setting means for setting a default format for use in recording of information by the recording apparatus;

second setting means for setting a second recording format, different from the default format, said second setting mans having a non-volatile memory which stores recording format information representing the second recording format to be set;

changing means for changing the recording format information stored in said non-volatile memory, on the basis of control information output from the information generating apparatus;

selecting means for selecting one of said first setting means and said second means in order to set one of said default format and said second recording format.

10. A control apparatus according to claim 9, wherein said selecting means selects said second setting means when recording format information for a particular recording format has been stored in said non-volatile memory, and selects said first setting means when a recording format information for the particular recording format has not been stored in said non-volatile memory.

* * * * *

UNITED STATES PATENT AND TRADEMARK OFFICE
CERTIFICATE OF CORRECTION

PATENT NO. : 5,197,123
DATED : March 23, 1993
INVENTOR(S) : SATOSHI NAGATA, ET AL.

It is certified that error appears in the above-identified patent and that said Letters Patent is hereby corrected as shown below:

COLUMN 1

Line 38, "Provided" should read --provided--.

COLUMN 4

Line 20, "Print" should read --print--.
   Line 65, "Proceeds" should read --proceeds--.

COLUMN 5

Line 43, "condition" should read --conditions--.

COLUMN 6

Line 29, "x'" should read --X--.
   Line 34, "an" should be deleted.

COLUMN 8

Line 16, "said" should read --each--.

UNITED STATES PATENT AND TRADEMARK OFFICE
CERTIFICATE OF CORRECTION

PATENT NO. : 5,197,123
DATED : March 23, 1993
INVENTOR(S) : SATOSHI NAGATA, ET AL.

It is certified that error appears in the above-identified patent and that said Letters Patent is hereby corrected as shown below:

<u>COLUMN 10</u>

Line 2, "second means" should read --second setting means--.

Signed and Sealed this

Eleventh Day of January, 1994

BRUCE LEHMAN

*Attest:*

*Attesting Officer*  *Commissioner of Patents and Trademarks*